B. H. HUBBERT.
ALCOHOL EXTRACTOR FOR BREW KETTLES.
APPLICATION FILED OCT. 4, 1917.

1,250,884.

Patented Dec. 18, 1917.

WITNESS
H. E. Barry

INVENTOR
B. H. HUBBERT
BY
ATTORNEYS

UNITED STATES PATENT OFFICE.

BARTHOLT H. HUBBERT, OF BALTIMORE, MARYLAND.

ALCOHOL-EXTRACTOR FOR BREW-KETTLES.

1,250,884.   Specification of Letters Patent.   Patented Dec. 18, 1917.

Application filed October 4, 1917. Serial No. 194,733.

*To all whom it may concern:*

Be it known that I, BARTHOLT H. HUBBERT, a citizen of the United States, and a resident of Baltimore, in the State of Maryland, have invented certain new and useful Improvements in Alcohol-Extractors for Brew-Kettles, of which the following is a specification.

My invention is an improvement in alcohol extractors for brew kettles, and has for its object to provide mechanism of the character specified, especially adapted for condensing and extracting the alcohol from beer to provide a beer free from alcohol.

Figure 2:
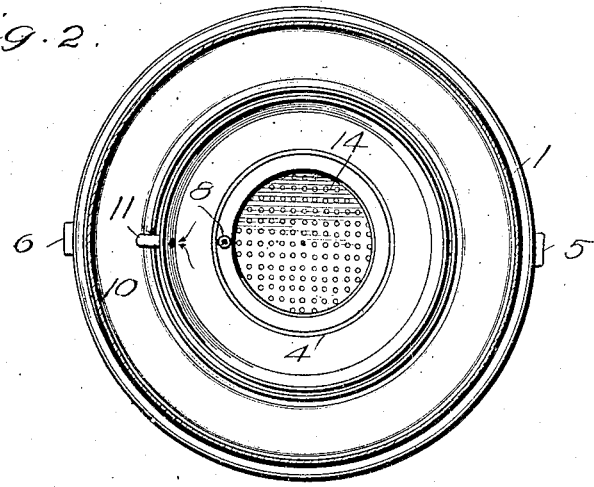
Fig. 2 is a vertical section through the center line of the device.
Figure 1:
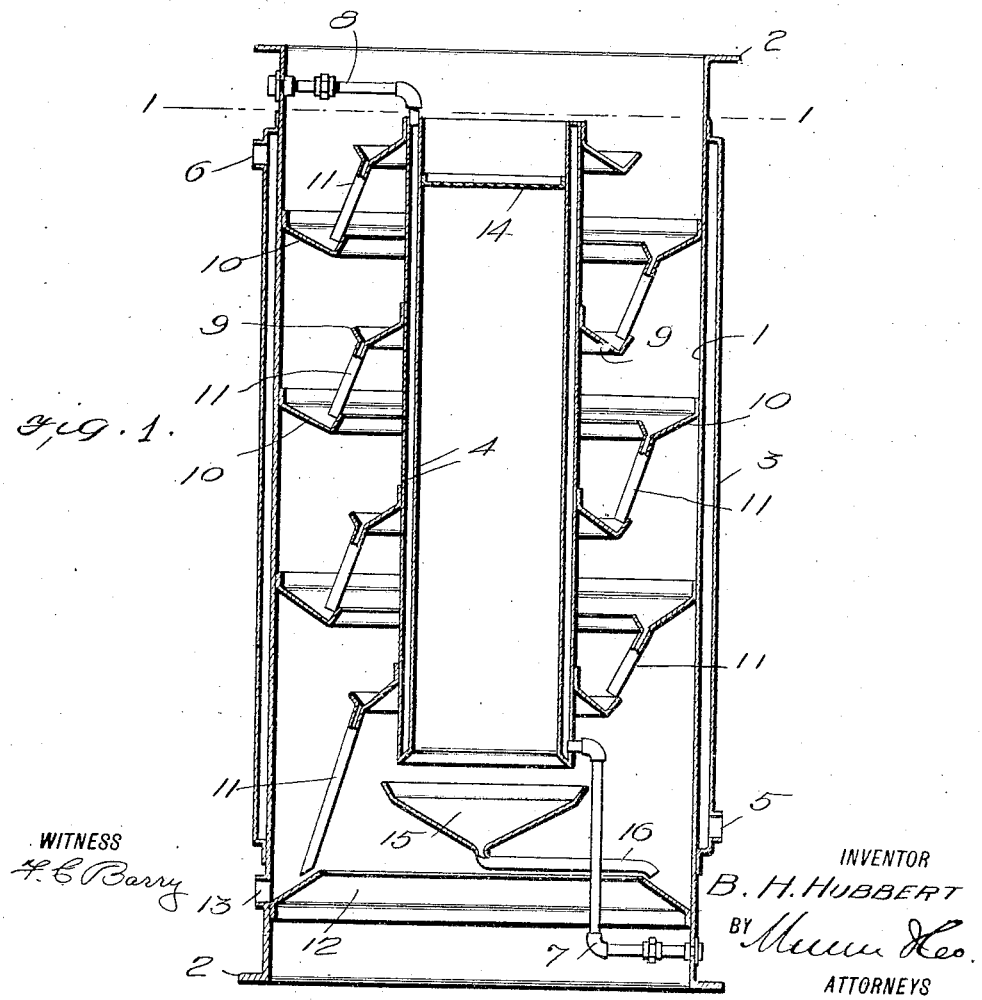
Figure 1 is a horizontal section through the improved extractor on line 1—1 of Fig. 2.

In the present embodiment of the invention a casing 1 is provided, having marginal flanges 2 at its top and bottom, and the casing is jacketed, as indicated at 3, throughout the greater portion of its length. Within the casing and coaxial therewith is arranged a double wall casing 4, the said casing extending from near the bottom to near the top of the casing 1. The jacket 3 has a water inlet 5 at its bottom and a water outlet 6 at its top, and water is supplied to the bottom of the casing 4 by means of an inlet pipe 7, the water discharging from the casing through an outlet pipe 8 at the top.

The vapor from the brew kettle passes upwardly through the casings, between the outer casing and the outer wall of the inner casing, and through the inner casing, and the alcohol is condensed during its passage. A series of troughs 9 is supported by the double wall or inner casing, the said troughs or gutters being annular in form and encircling the casing, and being arranged at spaced intervals.

A series of gutters or troughs 10 is supported by the outer casing 1, and these troughs 10, which are also annular in form and arranged in spaced relation, alternate with the troughs 9. Overflow or drain pipes 11 lead from the troughs 9 and deliver to the troughs 10, so that the condensed alcohol may flow from the troughs 9 to the troughs 10, eventually reaching the lowermost trough 9, from whence the said condensed products pass by means of a pipe 11 to the main alcohol catcher 12, which is a trough supported by the casing 1 near the bottom thereof, and an outlet 13 is provided for the alcohol at this point. A perforated baffle plate 14 is arranged near the top of the inner casing, just below the uppermost trough 9, for slowing the flow of the vapor through the inner casing.

In operation, the vapor from the brew kettle passes upwardly through the inner and the outer casings, and the alcohol is condensed by the cold water in the casing. This condensed alcohol is collected by the troughs 9 and 10 and flows from one trough to the other by way of the pipes 11, eventually reaching the collector 12, from whence it flows to a suitable receptacle.

In order to collect the alcohol from the inner casing or column a funnel shaped receiver 15 is arranged beneath the lower end of the inner casing, and this receiver delivers by a pipe 16 to the trough 12 at the opposite side from the outlet 13. The vapor that is condensed within the casing 4 is collected by the collector 15 and delivered to the collector 12.

It will be noticed that the vapors are constrained to follow a sinuous course from the bottom to the top of the extractor and they are thus slowed in their passage, the troughs acting as baffle plates for this purpose.

I claim:

1. An alcohol extractor for brew kettles, comprising inner and outer jacketed casings arranged coaxial and spaced apart from each other, means for supplying a cooling fluid to the casings, a series of troughs supported by each casing, the troughs for the inner casing being on the exterior of the casing and the troughs for the outer casing being on the interior thereof and alternating with the troughs of the inner casing, a drain pipe leading from each trough of the inner casing to the next lower trough of the outer casing, the lowermost trough of the outer casing having a discharge for the alcohol, and a funnel shaped receiver below the inner casing and having a discharge pipe delivering to the said lowermost trough of the outer casing.

2. An alcohol extractor for brew kettles, comprising inner and outer jacketed casings arranged co-axial and spaced apart from each other, means for supplying a cooling fluid to the casings, a series of troughs supported by each casing, the troughs for the inner casing being on the exterior of the casing and the troughs for the outer casing being on the interior thereof and alternating with the troughs of the inner casing, means for conducting the condensed alcohol between the troughs, and a receiver below the inner casing for the alcohol condensed therein.

3. An alcohol extractor for brew kettles, comprising inner and outer concentric jacketed casings, means for supplying a cooling fluid to the casings, trough shaped baffle plates secured to the interior of the outer casing and to the exterior of the inner casing, the plates of one casing alternating with those of the other, means for conducting the condensed alcohol between the troughs, and a collector for the alcohol below the inner casing.

BARTHOLT H. HUBBERT.

Copies of this patent may be obtained for five cents each, by addressing the "Commissioner of Patents, Washington, D. C."